(12) United States Patent
Sandstrom

(10) Patent No.: US 9,873,780 B1
(45) Date of Patent: Jan. 23, 2018

(54) TIRE WITH TREAD FOR COMBINATION OF LOW TEMPERATURE PERFORMANCE AND WET TRACTION

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 15/289,444

(22) Filed: Oct. 10, 2016

(51) Int. Cl.
| | |
|---|---|
| *C08L 9/00* | (2006.01) |
| *C08K 3/04* | (2006.01) |
| *C08K 3/36* | (2006.01) |
| *C08L 9/06* | (2006.01) |

(52) U.S. Cl.
CPC .......... *C08L 9/06* (2013.01); *C08L 2205/025* (2013.01); *C08L 2205/03* (2013.01); *C08L 2207/04* (2013.01)

(58) Field of Classification Search
CPC ... C08L 9/00; C08L 2205/025; C08L 2205/03
See application file for complete search history.

(56) References Cited

U.S. PATENT DOCUMENTS

| | | | |
|---|---|---|---|
| 6,429,245 B1 * | 8/2002 | Francik ................. | B60C 1/0016 152/450 |
| 6,448,318 B1 | 9/2002 | Sandstrom .................... | 524/284 |
| 9,441,098 B1 * | 9/2016 | Isitman ..................... | C08L 9/00 |
| 2005/0145312 A1 | 7/2005 | Herberger et al. ........... | 152/151 |
| 2013/0289183 A1 | 10/2013 | Kerns et al. ................. | 524/313 |
| 2014/0135437 A1 | 5/2014 | Sandstrom et al. .......... | 524/313 |
| 2017/0232795 A1 * | 8/2017 | Isitman ................. | B60C 1/0016 524/508 |

* cited by examiner

*Primary Examiner* — Robert Harlan
(74) *Attorney, Agent, or Firm* — Henry C. Young, Jr.

(57) ABSTRACT

This invention relates to a tire with tread for promoting a combination of winter service at low temperatures and for promoting wet traction. The tread rubber contains a combination of a high or low Tg styrene/butadiene elastomer, cis 1,4-polybutadiene rubber, reinforcing filler comprised of precipitated silica, rubber processing oil and tris(2-ethyl hexyl) phosphate.

20 Claims, No Drawings

TIRE WITH TREAD FOR COMBINATION OF LOW TEMPERATURE PERFORMANCE AND WET TRACTION

FIELD OF THE INVENTION

This invention relates to a tire with a tread for promoting a combination of winter service at low temperatures and for promoting wet traction. The tread rubber contains a combination of a high or low Tg styrene/butadiene elastomer, cis 1,4-polybutadiene rubber, reinforcing filler comprised of precipitated silica, rubber processing oil and tris(2-ethyl hexyl) phosphate.

BACKGROUND OF THE INVENTION

Tires are sometimes desired with treads for promoting traction on wet surfaces. Various rubber compositions may be proposed for such tire treads.

For example, tire tread rubber compositions which contain high molecular weight, high or low Tg (glass transition temperature) diene based elastomer(s) might be desired for such purpose particularly for wet traction (traction of tire treads on wet road surfaces). Such tire tread may be desired where its reinforcing filler is primarily precipitated silica which may therefore be considered as being precipitated silica rich.

In one embodiment, the improved predictive wet traction performance for the tread rubber composition is based on a maximization of its tan delta physical property at about 0° C. and a desired low value for rebound at about 0° C.

However, it might also be desired to provide such tread rubber composition containing a high or low Tg styrene/butadiene elastomer (SBR) for wet traction with a lower stiffness at lower temperatures to promote cold weather winter performance, particularly for vehicular snow driving.

In one embodiment, the predictive cold weather performance for the tread rubber composition is based on a minimization of its stiffness physical property at −20° C. (e.g. minimized storage modulus G').

Therefore, it is desirable to provide such vehicular tire tread with a rubber composition containing high or low Tg SBR elastomers with an optimized (maximized) tan delta property at about 0° C. (for predictive wet traction performance improvement) combined with an optimized (minimized) stiffness property at about −20° C. (for predictive cold weather performance improvement).

It is considered that significant challenges are presented for providing such tire tread rubber compositions that provide a combination of both wet traction and winter performance. To achieve the challenge of providing such balance of tread rubber performances with tread rubber compositions, it is recognized that concessions and adjustments would be expected.

To meet such challenge, it is desired to evaluate rubber compositions:

(A) utilizing a high or low Tg styrene/butadiene rubber,
(B) utilizing a low Tg cis 1,4-polybutadiene rubber,
(C) providing an inclusion of a traction promoting resin in the tread rubber composition to aid in promoting wet traction for the tread,
(D) providing reinforcing filler containing rubber reinforcing carbon black and high content of precipitated silica to also promote wet traction for the tire tread rubber composition, and
(E) providing tris(2-ethyl hexyl) phosphate to promote a lowering of the stiffness of the rubber composition at low temperatures while substantially maintaining a higher stiffness of the rubber composition at the operating temperature range of the tire tread, particularly in a range of about 40 to about 60° C.

Such rubber compositions may contain a petroleum and/or vegetable triglyceride based rubber processing oil to reduce the viscosity of the uncured rubber composition and to thereby promote more desirable processing conditions for the uncured rubber composition. In practice, the high viscosity SBR may be extended with the petroleum based oil or vegetable triglyceride oil in a sense of adding the oil to a low viscosity polymerization cement containing the SBR following polymerization of styrene and 1,3-butadiene monomers to form a composite of oil extended SBR with the petroleum oil or vegetable triglyceride oil before the composite is added to the rubber composition in an internal rubber mixer (e.g. Banbury rubber mixer). Alternately, the petroleum based oil or vegetable triglyceride oil may be added to the rubber composition in an internal rubber mixer to reduce the viscosity of the uncured rubber composition both in the internal rubber mixer and for subsequent rubber processing in a rubber processing apparatus such as, for example, in a rubber extruder.

As indicated, it is considered that significant challenges are presented for providing such tire tread rubber compositions for maintaining a balance of both their wet traction and also low temperature (e.g. winter) performance.

To achieve such balance of tread rubber performances with tread rubber compositions containing the high and/or low Tg diene-based elastomer(s), an application of combinations of petroleum based rubber processing oils and/or vegetable triglyceride type oils, such as for example soybean, sunflower and rapeseed oil, may be used to achieve the desired lower rubber stiffness at low operating temperatures while still promoting a predictive beneficial wet traction based on tan delta measurement at 0° C.

However, while the use of a vegetable triglyceride oil (e.g. soybean oil), has been observed to promote a desirable lower G' stiffness at about a −20° C. low temperature for the cured rubber composition, it has also been observed to promote a corresponding loss of stiffness of the cured rubber composition at a higher intended operating temperature range (about 40° C. to about 60° C.) of the tire. Such loss of stiffness at such higher operating temperature for a tire tread rubber composition can lead to a reduction of wet and dry handling performance for the tire.

To meet such challenge of providing a silica-rich tread rubber composition containing high and/or low Tg elastomer(s) to promote wet traction combined with promoting a reduction in its stiffness at low temperatures, but maintaining stiffness at higher ambient temperature conditions, it is desired to evaluate the following approach:

(A) replacing a portion of the rubber processing oil (e.g. petroleum based oil and/or vegetable triglyceride oil) with tris(2-ethyl hexyl) phosphate to promote a suitable uncured rubber processing viscosity and to promote a lower cured stiffness of the tread rubber composition at lower temperatures to thereby promote low temperature winter performance for the rubber composition, while maintaining the desired stiffness at higher operating conditions for the rubber composition to thereby promote maintenance of wet and dry handling performance for the tire, (B) adding a traction promoting resin in the tread rubber composition, particularly at a relatively high resin loading, to promote wet traction of the sulfur cured tread rubber composition, (C) providing a high content of precipitated silica-rich rubber reinforcing filler to promote wet traction for the cured rubber composition.

In the description of this invention, the terms "compounded" rubber compositions and "compounds" are used to refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

The glass transition temperature (Tg) of the solid elastomers may be determined by DSC (differential scanning calorimetry) measurements, as would be understood and well known by one having skill in such art. The softening point of a resin may be determined by ASTM E28 which might sometimes be referred to as a ring and ball softening point.

SUMMARY AND PRACTICE OF THE INVENTION

In accordance with this invention, a pneumatic tire is provided having a circumferential rubber tread intended to be ground-contacting, where said tread is a rubber composition comprised of, based on parts by weight per 100 parts by weight elastomer (phr):

(A) 100 phr of diene-based elastomers comprised of:
(1) about 25 to about 75 phr of a styrene/butadiene elastomer having a Tg in a range of from about −35° C. to about −5° C., alternately in a range of from about −30° C. to about −10° C. (high Tg SBR) or a Tg in a range of from about −85° C. to about −50° C., alternately in a range of from about −80° C. to −60° C. (low Tg SBR),
(2) about 25 to about 75 phr of high cis 1,4-polybutadiene rubber having a Tg in a range of from about −100° C. to about −109° C.,
(3) optionally about 0 to about 25, alternately a range of about 5 to about 15, phr of at least one of cis 1,4-polyisoprene (natural rubber or synthetic) rubber, co-polymers of isoprene and butadiene and co-polymers of isoprene and styrene, desirably cis 1,4-polyisoprene rubber,
(4) about 10 to about 50 phr, alternately from about 20 to about 40 phr of rubber processing oil comprised of at least one of petroleum based rubber processing oil and vegetable triglyceride oil,
(5) about 2 to about 40 phr, alternately from about 4 to about 20 phr, of tris(2-ethyl hexyl) phosphate and, (B) about 50 to about 250, alternately from about 75 to about 175, phr of rubber reinforcing filler comprised of a combination of precipitated silica (amorphous synthetic precipitated silica) and rubber reinforcing carbon black in a ratio of precipitated silica to rubber reinforcing carbon black of at least 9/1, together with silica coupling agent (silica coupler) having a moiety reactive with hydroxyl groups (e.g. silanol groups) on said precipitated silica and another different moiety interactive with said diene-based elastomers and polymer, (C) about 5 to about 60, alternately from about 8 to about 40, phr of traction promoting resin comprised of at least one of terpene, coumarone indene and styrene/alphamethylstyrene resins where such resins desirably have a softening point (ASTM E28) in a range of from about 30° C. to about 150° C.

In one embodiment, said high Tg SBR has a styrene content in a range of from about 5 to about 50 percent styrene and said low Tg SBR has a styrene content in a range of from about 5 to about 20 percent.

In one embodiment, said rubber composition contains said petroleum based rubber processing oil combined with said tris(2-ethyl hexyl) phosphate. Therefore, the rubber processing oil of said rubber composition may consist of said petroleum based rubber processing oil combined with said tris(2-ethyl hexyl) phosphate.

In one embodiment, said rubber composition contains said vegetable triglyceride based rubber processing oil combined with said tris(2-ethyl hexyl) phosphate. Therefore the rubber processing oil of said rubber composition may consist of said vegetable triglyceride oil combined with said tris(2-ethyl hexyl) phosphate. As indicated, such vegetable triglyceride oil may be comprised of, for example, at least one of soybean, sunflower and rapeseed oil, particularly comprised of soybean oil.

While the mechanism of the inclusion of the tris(2-ethyl hexyl) phosphate to replace a portion of the rubber processing oil or triglyceride oil is not clearly understood, it is apparent that it both helps to promote the stiffness at low strain (low dynamic elongation) of the rubber composition in the lower temperature range, but also helps to maintain the desired stiffness at low strain (low dynamic elongation) at higher operating temperatures with little or no significant negative impact (reduction in physical value) on other significant cured rubber properties relative to predictive wet traction, treadwear or tear resistance properties for a tire tread.

In one embodiment, said precipitated silica and silica coupler are reacted together in situ within said rubber composition.

In one embodiment, said precipitated silica and silica coupler are reacted together to form a composite thereof prior to addition to said rubber composition.

In one embodiment, where said precipitated silica is pre-reacted with said silica coupler to form a composite thereof prior to addition to said rubber composition, additional precipitated silica (non-pre-hydrophobated precipitated silica) is added to said rubber composition.

In one embodiment, where said precipitated silica is pre-reacted with said silica coupler to form a composite thereof prior to addition to said rubber composition, additional silica coupler is added to said rubber composition.

As indicated, in one embodiment, said tread rubber composition may contain up to 25, alternately up to about 15, phr of at least one additional diene based elastomer. Such additional elastomer may be comprised of, for example, at least one of cis 1,4-polyisoprene, isoprene/butadiene, styrene/isoprene and may also contain 3,4-polyisoprene rubber, usually desirably cis 1,4-polyisoprene rubber and particularly desirably natural cis 1,4-polyisoprene rubber.

In one embodiment, said styrene/butadiene elastomer may be a functionalized elastomer containing at least one of siloxane, amine and thiol groups or even carboxyl groups, reactive with hydroxyl groups on said precipitated silica.

In one embodiment, said styrene/butadiene elastomer may be a tin or silicon coupled elastomer.

The traction promoting resin, as indicated, is desirably comprised of at least one of styrene/alphamethylstyrene resin, coumarone-indene resin, petroleum hydrocarbon resin, terpene polymer, terpene phenol resin and rosin derived resin and copolymers.

In one embodiment, the resin is a styrene/alphamethylstyrene resin. Such styrene/alphamethylstyrene resin may be, for example, a relatively short chain copolymer of styrene and alphamethylstyrene. In one embodiment, such a resin may be suitably prepared, for example, by cationic copolymerization of styrene and alphamethylstyrene in a hydrocarbon solvent. The styrene/alphamethylstyrene resin may have, for example, a styrene content in a range of from about 10 to about 90 percent. The styrene/alphamethylstyrene resin may have a softening point, for example, in a range of from about 60° C. to about 125° C., alternately from about 80° C. to 90° C. (ASTM E28). A suitable styrene/alphamethylstyrene resin may be, for example, Resin 2336™ from Eastman or Sylvares SA85™ from Arizona Chemical.

In one embodiment, the resin is a coumarone-indene resin. Such coumarone-indene resin may have a softening point, for example, in a range of from about 30° C. to about 150° C. containing coumarone and indene as the monomer components making up the resin skeleton (main chain). Minor amounts of monomers other than coumarone and indene may be incorporated into the skeleton such as, for example, methyl coumarone, styrene, alphamethylstyrene, methylindene, vinyltoluene, dicyclopentadiene, cycopentadiene, and diolefins such as isoprene and piperlyene.

In one embodiment, the resin is a petroleum hydrocarbon resin. Such petroleum hydrocarbon resin may be, for example, an aromatic and/or nonaromatic (e.g. paraffinic) based resin. Various petroleum resins are available. Some petroleum hydrocarbon resins have a low degree of unsaturation and high aromatic content, whereas some are highly unsaturated and yet some contain no aromatic structure at all. Differences in the resins are largely due to the olefins contained in the petroleum based feedstock from which the resins are derived. Conventional olefins for such resins include any C5 olefins (olefins and di-olefins containing an average of five carbon atoms) such as, for example, cyclopentadiene, dicyclopentadiene, isoprene and piperylene, and any C9 olefins (olefins and di-olefins containing an average of 9 carbon atoms) such as, for example, vinyltoluene and alphamethylstyrene. Such resins may be made from mixtures of such C5 and C9 olefins and di-olefins.

In one embodiment, said resin is a terpene resin. Such resin may be comprised of, for example, polymers of at least one of limonene, alpha pinene and beta pinene and having a softening point in a range of from about 60° C. to about 160° C.

In one embodiment, the resin is a terpene-phenol resin. Such terpene-phenol resin may be, for example, a copolymer of phenolic monomer with a terpene such as, for example, limonene and pinene.

In one embodiment, the resin is a resin derived from rosin and derivatives. Representative thereof are, for example, gum rosin and wood rosin. Gum rosin and wood rosin have similar compositions, although the amount of components of the rosins may vary. Such resins may be in the form of esters of rosin acids and polyols such as pentaerythritol or glycol. In one embodiment, said resin may be partially or fully hydrogenated.

In further accordance with this invention, said tire is provided being sulfur cured.

The precipitated silica reinforcement may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the *Journal of the American Chemical Society*, Volume 60, as well as ASTM D3037.

Such precipitated silicas may, for example, also be characterized by having a dibutylphthalate (DBP) absorption value, for example, in a range of about 100 to about 400, and more usually about 150 to about 300 cc/100 g.

Various commercially available precipitated silicas may be used, such as, and not intended to be limiting, silicas from PPG Industries under the Hi-Sil trademark with designations 210, 243, etc.; silicas from Solvay with, for example, designations of Zeosil 1165MP and Zeosil 165GR; silicas from Evonik with, for example, designations VN2 and VN3; and chemically pre-treated precipitated silica (pre-hydrohobated precipitated silica) with silica coupler such as for example Agilon™ 400 from PPG Industries.

Representative examples of rubber reinforcing carbon blacks are, for example and not intended to be limiting, referenced in *The Vanderbilt Rubber Handbook*, 13$^{th}$ edition, 1990, on Pages 417 and 418 with their ASTM designations. As indicated, such rubber reinforcing carbon blacks may have iodine absorptions ranging from, for example, 60 to 240 g/kg and DBP values ranging from 34 to 150 cc/100 g.

As indicated, representative of the aforesaid silica coupler (silica coupling agents) for the precipitated silica are comprised of, for example:

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an organoalkoxymercaptosilane, or (C) their combination.

Representative of such bis(3-trialkoxysilylalkyl) polysulfide is comprised of bis(3-triethoxysilylpropyl) polysulfide.

It is readily understood by those having skill in the art that the vulcanizable rubber composition would be compounded by methods generally known in the rubber compounding art. In addition said compositions could also contain fatty acid, zinc oxide, waxes, antioxidants, antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of processing aids comprise about 1 to about 50 phr.

As indicated, the rubber composition contains petroleum based rubber processing oil and/or vegetable triglyceride oil (e.g. soybean, sunflower or rapeseed oil) together with said tris(2-ethyl hexyl) phosphate.

Typical amounts of antioxidants may comprise, for example, about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants may comprise, for example, about 1 to 5 phr. Typical amounts of fatty acids, if used, which can include stearic acid, comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, sulfenamides, and xanthates. Often desirably the primary accelerator is a sulfenamide. If a second accelerator is used, the secondary accelerator is often desirably a guanidine such as for example a diphenylguanidine.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the pneumatic tire containing the tire tread of the present invention is generally carried out at conventional temperatures in a range of, for example, from about 125° C. to 200° C. Often it is desired that the vulcanization is conducted at temperatures ranging from about 150° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr) unless otherwise indicated.

EXAMPLE I

Evaluation of Use of High Tg SBR

In this example, exemplary rubber compositions for a tire tread were prepared for evaluation for use to promote wet traction and cold weather (winter) performance.

A control rubber composition was prepared as Control rubber Sample A as a precipitated silica reinforced rubber composition containing a high Tg styrene/butadiene rubber (high Tg SBR) having a Tg of about −26° C. and a low Tg cis 1,4-polybutadiene rubber having a Tg of about −102° C. together with a silica coupler for the precipitated silica reinforcement and a styrene/alphamethylstyrene traction promoting resin.

Experimental rubber compositions were prepared as Experimental rubber Samples B and C with tris(2-ethyl hexyl) phosphate, rubber processing oil and soybean oil being variously added to the rubber composition which contains the high Tg styrene/butadiene rubber and low Tg cis 1,4-polybutadiene rubber.

The rubber compositions are illustrated in the following Table 1.

TABLE 1

| | Parts by Weight (phr) | | |
|---|---|---|---|
| Material | Control Sample A | Example B | Example C |
| High Tg styrene/butadiene rubber[1] | 55 | 55 | 55 |
| Cis 1,4-polybutadiene rubber[2] | 45 | 45 | 45 |
| Petroleum based rubber processing oil[3] | 40 | 30 | 30 |
| Soybean oil[4] | 0 | 10 | 0 |
| Tris(2-ethyl hexyl) phosphate[5] | 0 | 0 | 10 |
| Styrene/alphamethylstyrene resin[6] | 10 | 10 | 10 |
| Precipitated silica[7] | 125 | 125 | 125 |
| Silica couplers[8] | 9.8 | 9.8 | 9.8 |
| Fatty acids[9] | 5 | 5 | 5 |
| Carbon black | 1 | 1 | 1 |
| Wax (microcrystalline and/or paraffinic) | 1.5 | 1.5 | 1.5 |
| Antioxidants | 3 | 3 | 3 |
| Zinc oxide | 2.5 | 2.5 | 2.5 |
| Sulfur | 1.2 | 1.2 | 1.2 |
| Sulfur cure accelerators[10] | 5 | 5 | 5 |

[1]A high Tg styrene/butadiene rubber having a Tg of about −26° C. as Sprintan 4602 ™ from Trinseo
[2]High cis 1,4-polybutadiene rubber as BUD1223 ™ from The Goodyear Tire & Rubber Company having a Tg of about −102° C.
[3]Rubber processing oil primarily comprised of naphthenic oil
[4]Soybean oil as Sterling Oil from Stratus Food Company
[5]Tris(2-ethyl hexyl) phosphate
[6]Resin as styrene/alphamethylstyrene copolymer having a softening point in a range of about 80° C. to 90° C. (ASTM E28) and a styrene content in a range of from about 10 to about 30 percent as Resin 2336 ™ from Eastman Chemical
[7]Precipitated silica as Zeosil 1165MP ™ from Solvay
[8]Silica coupler comprised of bis(3-triethoxysilylpropyl) polysulfides containing an average in a range of from about 2 to about 2.6 connecting sulfur atoms and a range of from about 3 to 4 in the polysulfidic bridge as Si266 and Si69, respectively, from Evonik. One of the silica couplers was a composite with carbon black as a carrier, although the coupler and carbon black are reported separately in the Table.
[9]Fatty acids comprised of stearic, palmitic and oleic acids
[10]Sulfur cure accelerators as sulfenamide primary accelerator and diphenylguanidine secondary accelerator The rubber Samples were prepared by the same mixing procedures, wherein the elastomers and all other ingredients were added in two non-productive mixing stages and sulfur and accelerators were added in a final productive mixing stage.

The following Table 2 illustrates cure behavior and various physical properties of rubber compositions based upon the formulations of Table 1 and reported herein as Control rubber Sample A and Experimental rubber Samples B and C. Where cured rubber samples are reported, such as for the stress-strain, hot rebound and hardness values, the rubber samples were cured for about 14 minutes at a temperature of about 160° C.

To establish the predictive wet traction, a tangent delta (tan delta) test was run at 0° C. and a rebound test at 0° C.

To establish the predictive low temperature (winter snow) performance, the cured rubber compound stiffness (storage modulus G') test was run at −20° C.

To establish the predictive higher temperature wet and dry handling performance, the cured rubber compound stiffness (storage modulus G') test was run at 60° C.

TABLE 2

| | Parts by Weight (phr) | | |
|---|---|---|---|
| Material | Control Sample A | Example B | Example C |
| High Tg styrene/butadiene rubber | 75 | 75 | 75 |
| Cis 1,4-polybutadiene rubber | 25 | 25 | 25 |
| Petroleum based rubber processing oil | 40 | 30 | 30 |
| Soybean oil | 0 | 10 | 0 |
| Tris(2-ethyl hexyl) phosphate | 0 | 0 | 10 |
| Properties | | | |
| Wet Traction Laboratory Prediction | | | |
| Tan Delta, 10 Hz, 3% strain, 0° C. (higher is better) | 0.52 | 0.46 | 0.44 |
| Rebound, 0° C. (%), (lower is better) | 12 | 14 | 14 |
| Cold Weather (Winter) Performance (Stiffness) Laboratory Prediction | | | |
| Storage modulus (G'), (MPa) at −20° C., 10 Hertz, 3% strain (lower stiffness values are better) | 10.5 | 6.5 | 6.9 |
| Rolling Resistance (RR) Laboratory Prediction | | | |
| Rebound at 100° C. (%) (higher is better) | 46 | 46 | 45 |
| Tan delta, 10 Hz, 5% strain at 60° C., (lower is better) | 0.228 | 0.219 | 0.215 |
| Cured Rubber Stiffness | | | |
| Storage modulus (G'), (MPa) at 60° C., 10 Hertz, 5% strain, (higher is better) | 1.56 | 1.32 | 1.51 |
| Additional properties | | | |
| Tensile strength (MPa) | 8.7 | 9.1 | 9.4 |
| Elongation at break (%) | 342 | 437 | 388 |
| Modulus 300% (MPa) | 7.8 | 6.0 | 7.2 |

From Table 2 it is observed that:

(A) For Experimental rubber Sample B, where 10 phr of conventional petroleum based rubber processing oil of Control rubber Sample A was replaced with 10 phr soybean oil, a significant improved predictive cold weather (winter) performance was obtained based on a lower storage modulus G' value of 6.5 at −20° C. as compared to a significantly higher G' stiffness value of 10.5 for Control rubber Sample A. Further, a favorable predictive wet traction was maintained for rubber Sample B based on tan delta value of 0.46 at 0° C. and rebound value of 14 at 0° C. being similar to the tan delta of 0.52 and rebound value of 12, respectively of Control rubber Sample A, based on the laboratory results.

(B) For Experimental rubber Sample C, where 10 phr of conventional petroleum based rubber processing oil of Control rubber Sample A was replaced with 10 phr tris(2-ethyl hexyl) phosphate, tan delta and rebound values at 0° C. for predictive wet traction were similar to Control rubber Sample A and the predictive cold weather performance based on G' stiffness at −20° C. was similar to Experimental rubber Sample B which contained the soybean oil as a partial replacement for the conventional petroleum based rubber processing oil.

(C) However the unique discovery is observed when comparing the higher temperature stiffness (G' at 60° C.) of the Control rubber Sample A with the experimental Samples B and C. In particular, it is observed that whereas the stiffness (the G' value) at 60° C. for Experimental rubber Sample B is reduced to a value of 1.3 when adding soybean oil, the stiffness (G') value of 1.5 remained similar to the stiffness (G') value of 1.5 for Control rubber Sample A when adding the tris(2-ethyl hexyl) phosphate in Experimental rubber Sample C. This finding is significant in that Experimental rubber Sample C would therefore provide a tread compound having improved low temperature performance for winter applications and similar wet traction when compared to the use of soybean oil (Experimental rubber sample B), but would have the desired stiffness value at higher temperatures for wet and dry handling performance as compared to the use of the soybean oil (Experimental rubber Sample B) which would also show improved low temperature performance, similar wet traction but a lower stiffness value at higher temperature and a corresponding loss of wet and dry handling performance. This result and discovery is totally unexpected prior to the laboratory studies conducted.

EXAMPLE II

Evaluation of Use of Low Tg SBR

In this example, exemplary rubber compositions for a tire tread were prepared for evaluation for use to promote wet traction and cold weather (winter) performance similar to Example I except that a low Tg styrene/butadiene rubber (low Tg SBR) having a Tg of about −76° C. was used instead of the high Tg styrene/butadiene rubber of Example I.

A control rubber composition was prepared as Control rubber Sample D with a precipitated silica reinforced rubber composition containing the low Tg styrene/butadiene rubber and low Tg cis 1,4-polybutadiene rubber together with a silica coupler for the precipitated silica reinforcement and a styrene/alphamethylstyrene resin.

Experimental rubber compositions were prepared as Experimental rubber Samples E and F with tris(2-ethyl hexyl) phosphate and petroleum based rubber processing oil and soybean oil being variously added to the rubber composition which contains the low Tg styrene/butadiene rubber and low Tg cis 1,4-polybutadiene rubber.

The rubber compositions are illustrated in the following Table 3.

TABLE 3

| | Parts by Weight (phr) | | |
|---|---|---|---|
| Material | Control Sample A | Example B | Example C |
| Low Tg styrene/butadiene rubber[11] | 75 | 75 | 75 |
| Cis 1,4-polybutadiene rubber[2] | 25 | 25 | 25 |
| Petroleum based rubber processing oil[3] | 26 | 13 | 13 |
| Soybean triglyceride oil[4] | 0 | 13 | 0 |
| Tris(2-ethyl hexyl) phosphate[5] | 0 | 0 | 13 |
| Styrene/alphamethylstyrene resin[6] | 36 | 36 | 36 |
| Precipitated silica[7] | 140 | 140 | 140 |
| Silica couplers[8] | 10.8 | 10.8 | 10.8 |
| Fatty acids[9] | 5 | 5 | 5 |
| Carbon black | 1 | 1 | 1 |
| Wax (microcrystalline and/or paraffinic) | 1.5 | 1.5 | 15 |

TABLE 3-continued

| Material | Parts by Weight (phr) | | |
|---|---|---|---|
| | Control Sample A | Example B | Example C |
| Antioxidants | 3.5 | 3.5 | 3.5 |
| Zinc oxide | 2.5 | 2.5 | 2.5 |
| Sulfur | 1.2 | 1.2 | 1.2 |
| Sulfur cure accelerators[10] | 5.5 | 5.5 | 5.5 |

[11]A low Tg styrene/butadiene rubber having a Tg of about −76° C. as Sprintan SLR302 ™ from Trinseo.

The indicated ingredients were the ingredients used for Example I except that a low Tg SBR was used instead of the high Tg SBR of Example I.

The rubber Samples were prepared in the manner of Example I.

The following Table 4 illustrates cure behavior and various physical properties of rubber compositions based upon the basic formulation of Table 3 and reported herein as Control rubber Sample D and Experimental rubber Samples E and F. Where cured rubber samples are reported, such as for the stress-strain, hot rebound and hardness values, the rubber samples were cured for about 14 minutes at a temperature of about 160° C.

To establish the predictive wet traction, a tangent delta (tan delta) test was run at 0° C. and a rebound test at 0° C.

To establish the predictive low temperature (winter snow) performance, the cured rubber compound stiffness (storage modulus G') test was run at −20° C.

To establish the predictive higher temperature wet and dry handling performance, the cured rubber compound stiffness (storage modulus G') test was run at 60° C.

TABLE 4

| Material | Parts by Weight (phr) | | |
|---|---|---|---|
| | Control Sample A | Example B | Example C |
| Low Tg styrene/butadiene rubber | 75 | 75 | 75 |
| Cis 1,4-polybutadiene rubber | 25 | 25 | 25 |
| Rubber processing oil | 26 | 13 | 13 |
| Soybean oil | 0 | 13 | 0 |
| Tris(2-ethyl hexyl) phosphate | 0 | 0 | 13 |
| Properties | | | |
| Wet Traction Laboratory Prediction | | | |
| Tan Delta, 10 Hz. 3% strain, 0° C. (higher is better) | 0.58 | 0.49 | 0.45 |
| Rebound, (%) 0° C. (lower is better) | 12 | 12 | 13 |
| Cold Weather (Winter) Performance (Stiffness) Laboratory Prediction | | | |
| Storage modulus (G'), (MPa) at −20° C., 10 Hertz, 3% strain (lower stiffness values are better) | 18.2 | 16.6 | 14.9 |
| Rolling Resistance (RR) Laboratory Prediction | | | |
| Rebound at 100° C. (%) (higher is better) | 41 | 40 | 45 |
| Tan delta, 10 Hz, 5% strain, 60° C., (lower is better) | 0.3 | 0.3 | 0.27 |
| Cured Rubber Stiffness | | | |
| Storage modulus (G'), (MPa) at 60° C., 10 Hz, 5% strain (higher is better) | 2.38 | 2.64 | 2.99 |
| Additional properties | | | |
| Tensile strength (MPa) | 10.0 | 8.94 | 11.3 |
| Elongation at break (%) | 557 | 580 | 573 |

TABLE 4-continued

| Material | Parts by Weight (phr) | | |
|---|---|---|---|
| | Control Sample A | Example B | Example C |
| Modulus 300% (MPa) | 4.9 | 4.2 | 5.2 |
| Tear resistance[1] (tear strength - Newtons) (higher is better) | 40 | 38 | 74 |

[1]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force (N).

From Table 4 it is observed that:

(A) For Experimental rubber Sample E, where 13 phr of conventional petroleum based rubber processing oil of Control rubber Sample D was replaced with 13 phr of soybean oil, a significant improved predictive cold weather (winter) performance was obtained based on a somewhat lower storage modulus G' stiffness value of 16.6 at −20° C. as compared to a value of 18.2 for Control rubber Sample D. The predictive wet traction based on tan delta value of 0.49 at 0° C. and rebound value of 12 at 0° C. for Experimental rubber Sample E are similar to tan delta value of 0.58 and rebound value of 12 for Control Sample D, based on the laboratory test results.

(B) For Experimental rubber Sample F, where 13 phr of conventional petroleum based processing oil was replaced with 13 phr of tris(2-ethylhexyl) phosphate, a significant improved predictive cold weather (winter) performance was obtained based on a lower storage modulus G' stiffness value of 14.9 at −20° C. as compared to a value of 18.2 for Control rubber Sample D and when compared to a value of 16.6 for Experimental rubber Sample E, which contained the soybean oil as a partial replacement for conventional petroleum based rubber processing oil. The predictive wet traction based on tan delta value of 0.45 at 0° C. and rebound value of 13 at 0° C. for Experimental rubber Sample F are similar to tan delta value of 0.58 and rebound value of 12 for Control Sample D, based on the laboratory test results.

(C) However, in this Example, Experimental sample F, which contained the tris-(2-ethyl hexyl) phosphate showed additional benefits in predictive performance. It not only gave the highest stiffness (G' values) of all the rubber compositions at 60° C., predictive of improved wet and dry handling, even better than the Control rubber Sample E, but also gave the best results predictive of improved beneficial rolling resistance for a tread of such rubber composition (namely rebound at 100° C. and tan delta at 60° C.), and also the highest beneficial tear strength of all the rubber Samples. This indicates that the benefits in performance might be somewhat related also to the Tg, whether high or low, of the styrene/butadiene elastomer used in the tread rubber compound. This again represents an unexpected unique discovery from the extremely positive results for the use of tris(2-ethylhexyl) phosphate in tread compounds containing high levels of silica and traction resins. One would therefore be expected to produce tire results having a beneficial combination of significant wet traction, significant cold weather winter performance, improved wet and dry handling and also potential benefits in predictive tire rolling resistance and tread rubber tear resistance depending somewhat on the choice of the low Tg or high Tg SBR.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a circumferential rubber tread of a rubber composition comprised of, based on parts by weight per 100 parts by weight elastomer (phr):
    (A) 100 phr of diene-based elastomers comprised of:
        (1) about 25 to about 75 phr of a styrene/butadiene elastomer having a Tg in a range of from about −35° C. to about −5° C. (high Tg SBR) or a Tg in a range of from about −85° C. to about −50° C. (low Tg SBR),
        (2) about 25 to about 75 phr of high cis 1,4-polybutadiene rubber having a Tg in a range of from about −100° C. to about −109° C.,
        (3) optionally about 0 to about 25 phr of at least one of cis 1,4-polyisoprene, copolymers of isoprene and butadiene and copolymers of isoprene and styrene,
        (4) about 10 to about 50 phr of rubber processing oil comprised of at least one of petroleum based rubber processing oil and vegetable triglyceride oil, and
        (5) about 2 to about 40 phr of tris(2-ethyl hexyl) phosphate;
    (B) about 50 to about 250 phr of rubber reinforcing filler comprised of a combination of precipitated silica and rubber reinforcing carbon black in a ratio of precipitated silica to rubber reinforcing carbon black of at least 9/1, together with silica coupling agent having a moiety reactive with hydroxyl groups on said precipitated silica and another different moiety interactive with said diene-based elastomers and polymer; and
    (C) about 5 to about 60 phr of traction promoting resin comprised of at least one of terpene, coumarone indene and styrene-alphamethylstyrene resins having a softening point (ASTM E28) in a range of from about 60° C. to about 150° C.

2. The tire of claim 1 wherein said styrene/butadiene rubber has a Tg in a range of from about −35° C. to about −5° C. (high Tg SBR).

3. The tire of claim 1 wherein said styrene/butadiene rubber has a Tg in a range of from about −85° C. to about −50° C. (low Tg SBR).

4. The tire of claim 1 wherein said high Tg SBR has a styrene content in a range of from about 5 to about 50 percent and said low Tg SBR has a styrene content in a range of from about 5 to about 20 percent.

5. The tire of claim 1 wherein said silica coupler is comprised of:
    (A) bis(3-triethoxysilylpropyl polysulfide containing an average in range of from about 2 to about 4 sulfur atoms in its connecting bridge, or
    (B) an organoalkoxymercaptosilane, or
    (C) their combination.

6. The tire of claim 1 where said silica coupler is comprised of bis(3-triethoxysilylpropyl) polysulfide containing an average in range of from about 2 to about 2.6 or from about 3.2 to about 3.8 sulfur atoms in its connecting bridge.

7. The tire of claim 1 wherein said silica coupler is an organoalkoxymercaptosilane.

8. The tire of claim 1 wherein said precipitated silica and silica coupler are reacted together in situ within said rubber composition.

9. The tire of claim 1 wherein said precipitated silica and silica coupler are reacted together to form a composite thereof prior to addition to said rubber composition.

10. The tire of claim 1 wherein said precipitated silica is pre-reacted with said silica coupler to form a composite thereof prior to addition to said rubber composition, additional precipitated silica is added to said rubber composition.

11. The tire of claim 1 wherein said precipitated silica is pre-reacted with said silica coupler to form a composite thereof prior to addition to said rubber composition, additional silica coupler is added to said rubber composition.

12. The tire of claim 1 wherein said tread rubber composition contains up to 25 phr of at least one of cis 1,4-polyisoprene, isoprene/butadiene, styrene/isoprene and 3,4-polyisoprene rubber.

13. The tire of claim 1 wherein said tread rubber composition contains up to 25 phr of cis 1,4-polyisoprene rubber.

14. The tire of claim 1 wherein said styrene/butadiene elastomer is a functionalized elastomer containing at least one of siloxane, amine, thiol and carboxyl groups reactive with hydroxyl groups on said precipitated silica.

15. The tire of claim 1 wherein said styrene/butadiene elastomer is a tin or silicon coupled elastomer.

16. The tire of claim 1 wherein said rubber composition contains said petroleum based rubber processing oil combined with said tris(2-ethyl hexyl) phosphate.

17. The tire of claim 1 wherein said rubber composition contains said vegetable triglyceride oil combined with said tris(2-ethyl hexyl) phosphate.

18. The tire of claim 17 wherein said vegetable triglyceride oil is comprised of at least one of soybean, sunflower and rapeseed oil.

19. The tire of claim 1 wherein said rubber composition contains a combination of petroleum based rubber processing oil and vegetable triglyceride oil comprised of soybean oil together with said tris(2-ethyl hexyl) phosphate.

20. The tire of claim 17 wherein said vegetable triglyceride oil is comprised of soybean oil.

* * * * *